United States Patent [19]
Xiao

[11] Patent Number: 5,899,840
[45] Date of Patent: May 4, 1999

[54] TOOL CHANGER FOR MACHINE

[76] Inventor: Alan Xiao, No. 436, Sec. 1, Chong San Road, Tarn Tzu Hsiang, Taichung Hsien, Taiwan

[21] Appl. No.: 08/895,943

[22] Filed: Jul. 17, 1997

[51] Int. Cl.[6] .................................................. B23Q 3/155
[52] U.S. Cl. .................................. 483/67; 483/54; 483/56
[58] Field of Search .................................. 483/30, 54, 55, 483/56, 58, 66, 67, 13, 24

[56] References Cited

U.S. PATENT DOCUMENTS

| | | | |
|---|---|---|---|
| 3,174,222 | 3/1965 | Pohl | 483/54 |
| 3,186,085 | 6/1965 | Coate | 483/24 |
| 3,292,235 | 12/1966 | Riedel | 483/54 |
| 3,316,629 | 5/1967 | Meyer | 483/66 |
| 3,789,473 | 2/1974 | Pagella et al. | 483/66 |
| 4,122,598 | 10/1978 | Pegler et al. | 483/54 |
| 4,335,498 | 6/1982 | Hague et al. | 483/67 |
| 4,356,620 | 11/1982 | Babel et al. | 483/67 |
| 4,399,604 | 8/1983 | Krug | 483/67 |
| 4,776,081 | 10/1988 | Okunishi et al. | 483/66 |
| 4,914,803 | 4/1990 | Kitamura et al. | 483/67 |
| 5,762,594 | 6/1998 | Hoppe | 483/56 |

*Primary Examiner*—Andrea L. Pitts
*Assistant Examiner*—Christopher Kirkman

[57] ABSTRACT

A tool changer for a machine includes a disc having a number of protrusions extended radially outward and a number of grooves formed between the protrusions. A rod has a projection for engaging with the grooves of the disc and for precisely rotating the disc step by step when the rod is rotated. The protrusions each includes a curved rib. The rod includes a stud and one or more stops for engaging with the curved rib and for retaining the curved rib and the disc in place when the projection does not rotate the disc.

6 Claims, 5 Drawing Sheets

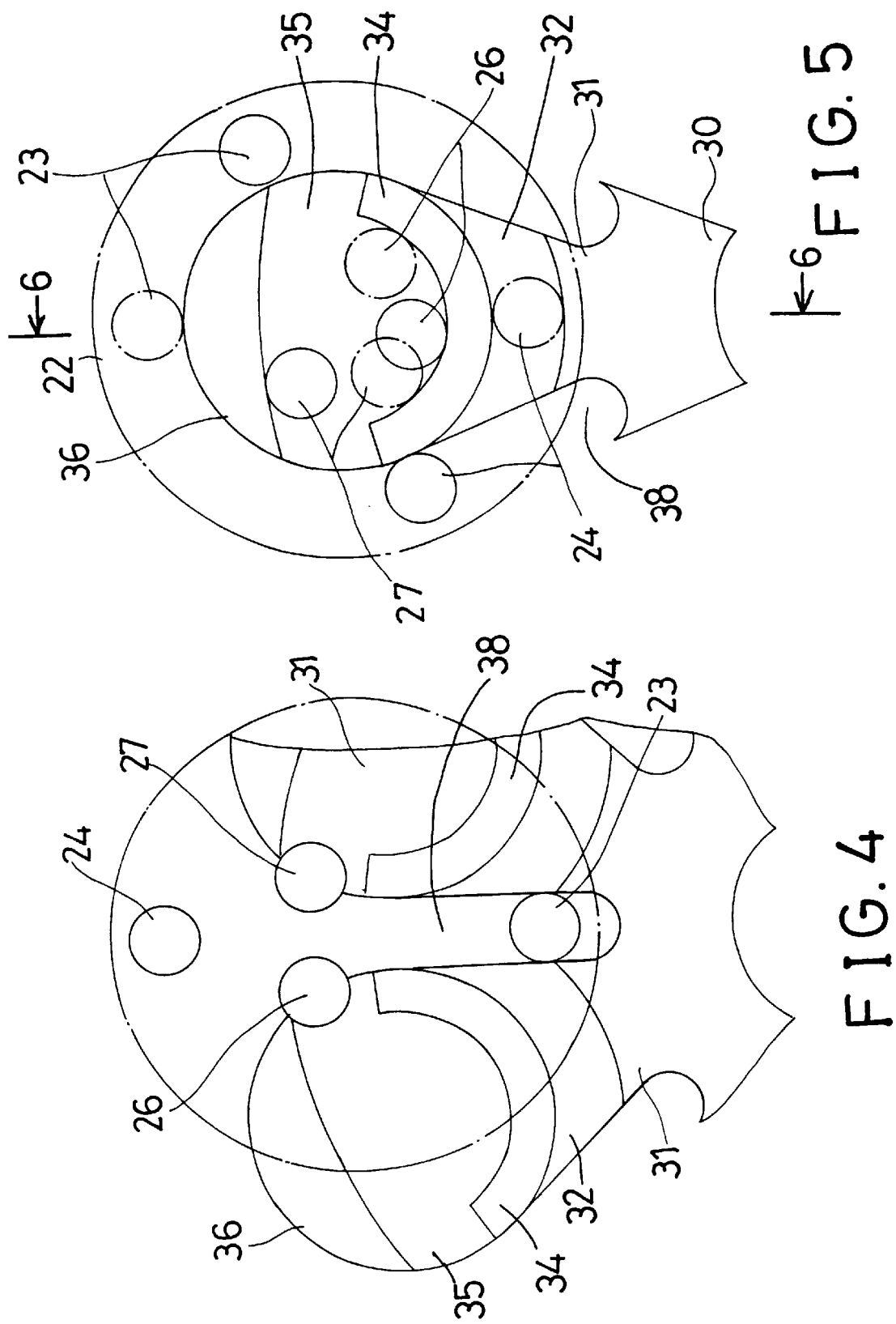

TOOL CHANGER FOR MACHINE

BACKGROUND OF THE INVENTION

1. Field of the Invention

The present invention relates to a tool changer, and more particularly to a tool changer for a machine.

2. Description of the Prior Art

Typical machines, such as drilling machines, milling machines etc., comprise a chuck for engaging with tool bits and for driving the tool bits to conduct drilling or milling operations. For most of the machining operations, a number of tool bits of various sizes are required. However, it is difficult and complicated to change the tool bits, and it wastes a lot of time for changing the tool bits manually.

The present invention has arisen to mitigate and/or obviate the afore-described disadvantages of the conventional tool bits exchanging problems.

SUMMARY OF THE INVENTION

The primary objective of the present invention is to provide a tool changer which may precisely change the tool bits to the required position.

In accordance with one aspect of the invention, there is provided a tool changer for a machine, the tool changer comprises a disc including a plurality of protrusions extended radially outward and a plurality of grooves defined between the protrusions, a rod including a projection for engaging with the grooves of the disc and for allowing the projection to rotate the disc step by step when the rod is rotated, means for rotating the rod and for rotating the disc step by step, and means for retaining the disc in place when the projection is disengaged from the grooves. The disc may thus be precisely rotated step by step for feeding tool bits step by step to a chuck of the machine. The retaining means may position the disc in place when the disc is not rotated by the projection.

The protrusions each includes a middle portion having a curved rib extended upward, the retaining means includes a stud and at least one stop for engaging with the curved rib and for retaining the curved rib and the disc in place. The protrusions each includes a curved slot formed in a radially inner portion for slidably engaging with the stud.

The protrusions each includes a circular member formed in a radially outer portion and having a circular outer surface for engaging with the projection. The protrusions each includes a shoulder formed in the radially outer portion and formed in the circular member.

The rod includes a board secured to the first end thereof, the projection and the stud and the stop are extended from the board. The projection has a length greater than that of the stud and the stop.

Further objectives and advantages of the present invention will become apparent from a careful reading of a detailed description provided hereinbelow, with appropriate reference to accompanying drawings.

BRIEF DESCRIPTION OF THE DRAWINGS

FIGS. 4 and 5 are schematic views illustrating the operation of the tool changer.

DETAILED DESCRIPTION OF THE PREFERRED EMBODIMENT

Figure 1:
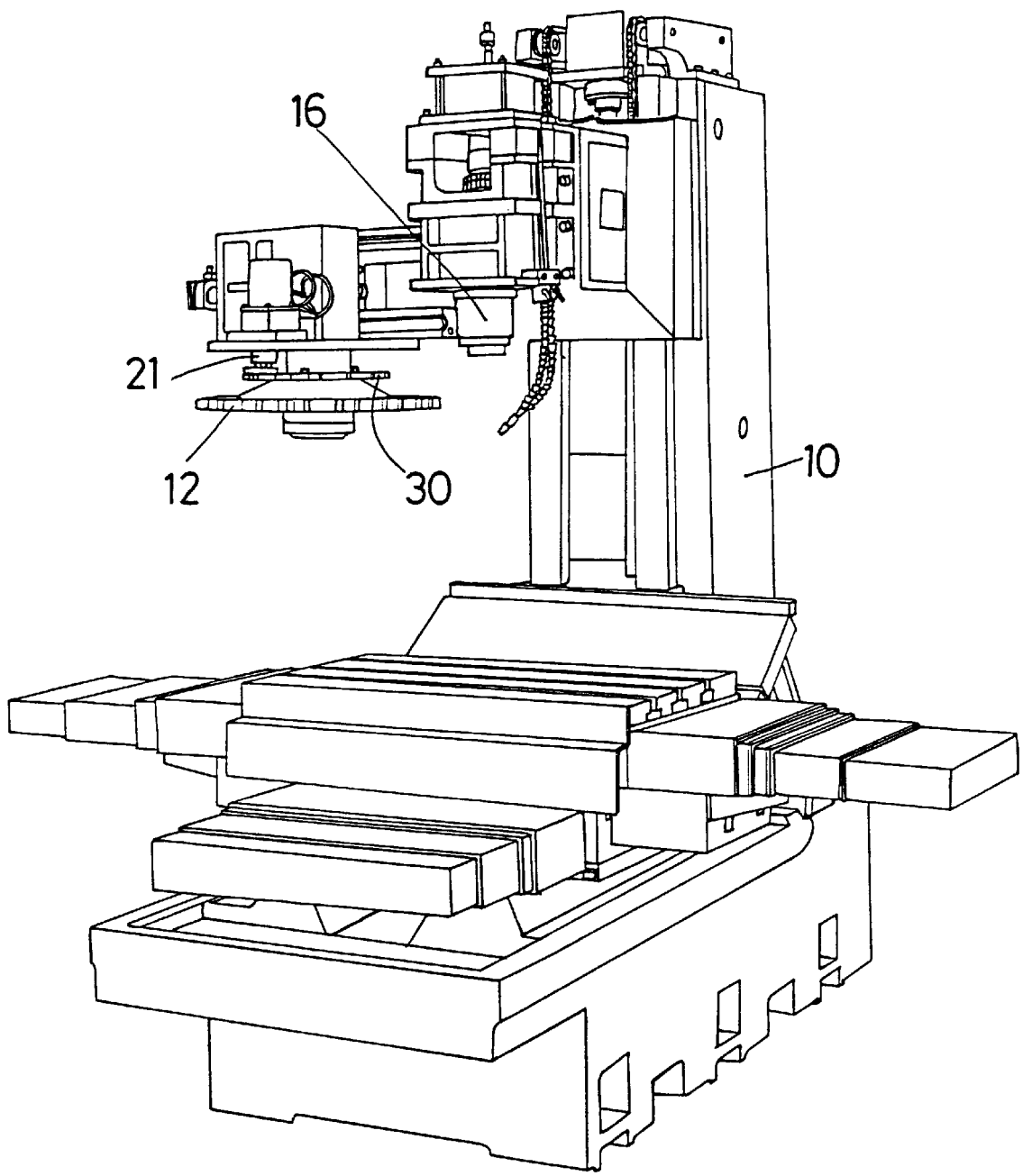
FIG. 1 is a perspective view of a machine having a tool changer in accordance with the present invention.
Figure 2:
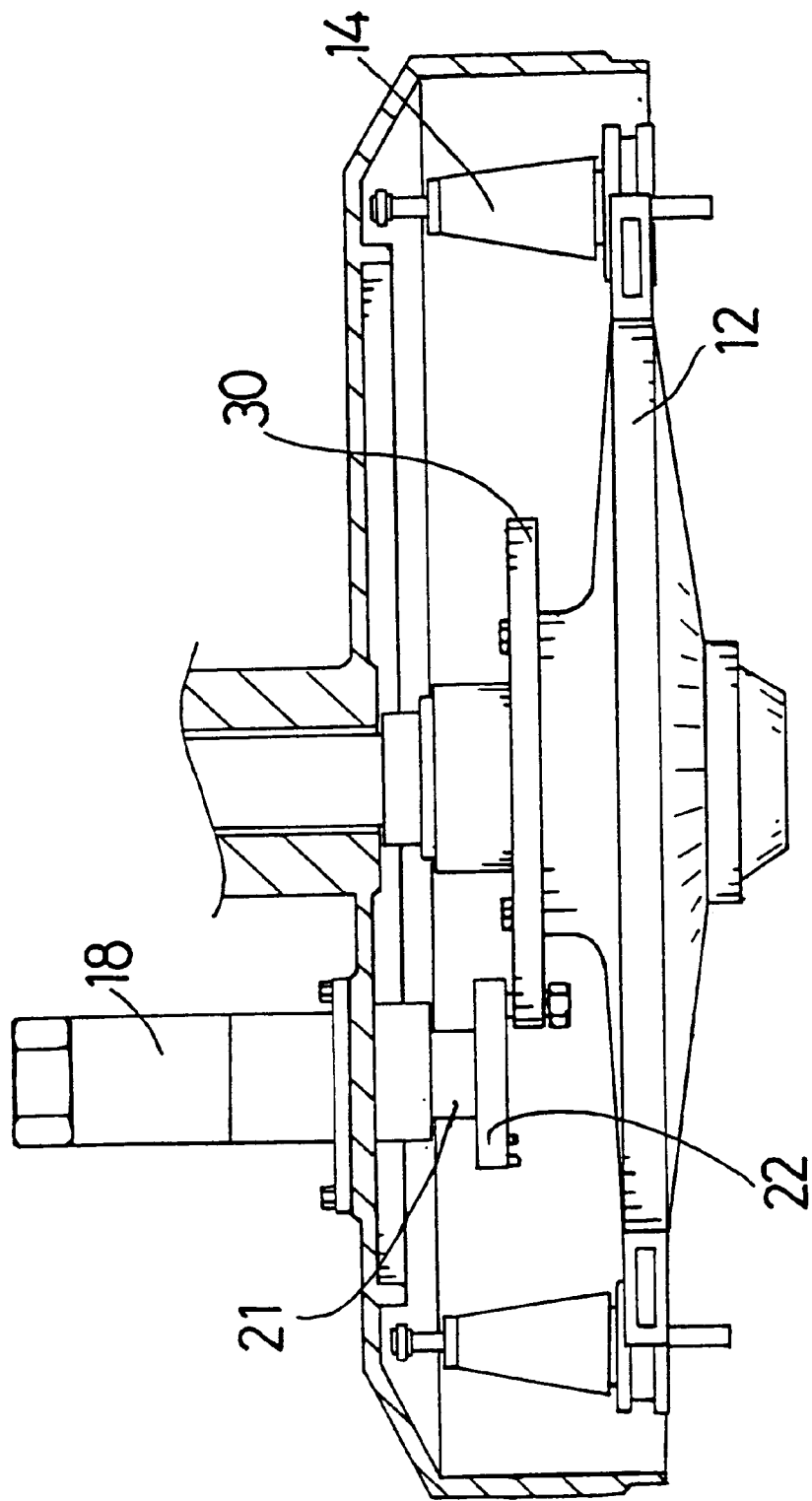
FIG. 2 is a partial cross sectional view of the machine for illustrating the tool changer.
Figure 3:
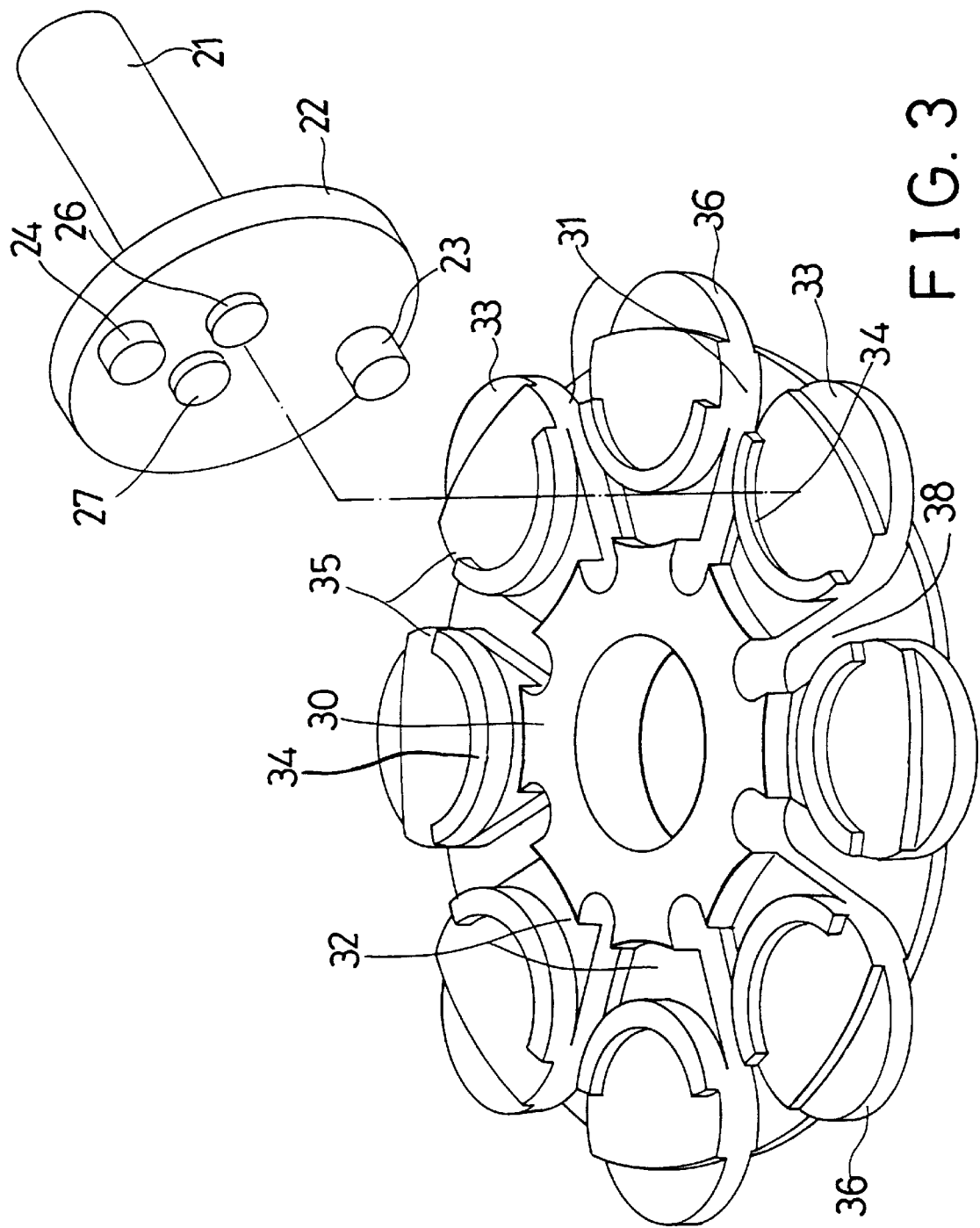
FIG. 3 is an exploded view of the tool changer.

Referring to the drawings, and initially to FIGS. 1–3, a tool changer in accordance with the present invention is provided in a machine 10 which includes a chuck 16 for engaging with tool bits. The machine 10 includes a plate 12 for supporting a number of tool bits 14 (FIG. 2) in the peripheral portion and for supplying the tool bits 14 to the position beneath the chuck 16 and for allowing the chuck 16 to engage with the required tool bit 14. A disc 30 is secured to the plate 12 and rotated in concert with the plate 12. A rod 21 is driven by a motor 18 for rotating the disc 30 step by step and for precisely feeding the tool bit 14 to the position beneath the chuck 16.

Referring again to FIG. 3, the disc 30 includes a number of protrusions 31 extended radially outward and a number of grooves 38 defined between the protrusions 31. The protrusions 31 each includes a curved slot 32 formed in the radially inner portion and each includes a circular member 35 formed in the radially outer portion and having a circular outer surface 36. A curved rib 34 extends upward from the middle portion of each of the protrusions 31. The outer peripheral surface of the curved rib 34 and the circular outer surface 36 form the circular outer peripheral portion of the circular member 35. The protrusions 31 each includes a shoulder 33 formed in the radially outer portion and formed in the circular members 35. The rod 20 includes a board 22 having a projection 23 for engaging with the grooves 38 and for rotating the disc 30. The board 22 further includes a stud 24 for engaging with the slot 32 and for engaging with the convex outer surface of the curved rib 34 and includes two stops 26, 27 for engaging with the concave inner surface of the curved rib 34 (FIG. 5). The stud 24 may engage with the shoulder 33 and may be prevented from rotating the disc 30.

Figure 6:
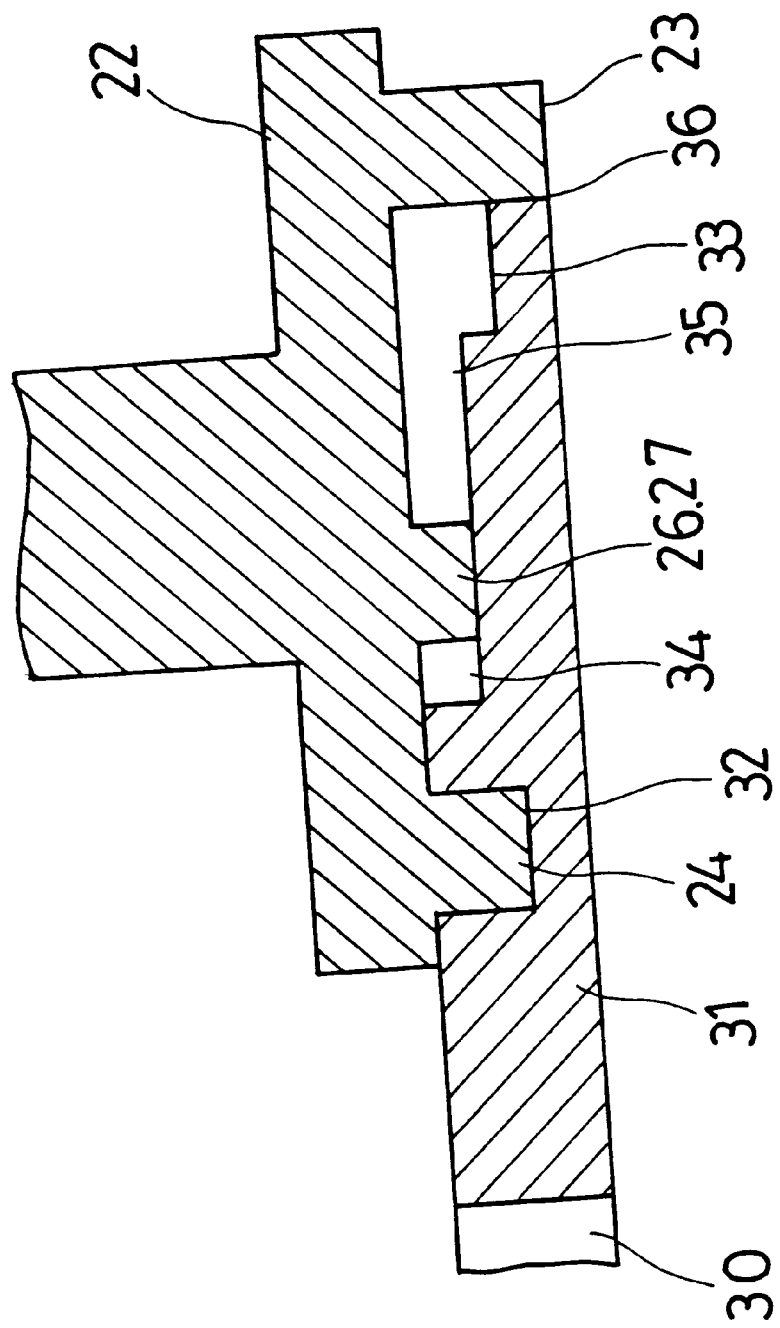
FIG. 6 is a cross sectional view taken along lines 6–6 of FIG. 5.

As best shown in FIG. 6, the projection 23 is longer than the stud 24 and the stops 26, 27 for allowing the projection 23 to rotate the disc 30. The stud 24 is slidably engaged with the slot 32 and thus may not rotate the disc 30. The stops 26, 27 are the shortest for engaging with the curved rib 34.

Referring next to FIG. 4, when the rod 21 is rotated by the motor 18, the projection 23 may engage into the groove 38 for allowing the projection 23 to rotate the protrusion 31 one by one and in order to rotate the disc 30 step by step. At this moment, the stud 24 and the stops 26, 27 are disengaged from the curved rib 34. As shown in FIG. 5, when the projection 23 is engaged with the curved outer peripheral surface 36 of the circular member 35 and does not rotate the disc 30, the stud 24 may be slidably engaged in the slot 32, and the stops 26, 27 may be engaged with the curved rib 34 such that the stud 24 and the stops 26, 27 may engage with the curved rib 34 and may maintain the disc 30 in place before the projection 23 is engaged into another groove 38 for further rotating the disc 30.

Accordingly, the tool changer in accordance with the present invention includes a projection 23 for precisely rotating the disc 30 step by step and includes a stud 24 and two stops 26, 27 for retaining the disc 30 in place when the projection 23 does not rotate the disc 30. The disc 30 thus may be precisely rotated step by step for rotating the plate 12 and for precisely feeding the tool bits 14 to the position beneath the chuck 16 of the machine 10.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A tool changer for a machine, said tool changer comprising:

a disc including a plurality of protrusions extended radially outward and a plurality of grooves defined between said protrusion, said protrusions each including a middle portion having a curved rib extended upward, a rod including a first end having a projection for engaging with said grooves of said disc and for allowing said projection to rotate said disc step by step when said rod is rotated, means for rotating said rod and for rotating said disc step by step, and means for retaining said disc in place when said projection is disengaged from said grooves, said retaining means including a stud and at least one stop for engaging with said curved rib and for retaining said curved rib and said disc in place.

2. A tool changer according to claim 1, wherein said protrusions each include a curved slot formed in a radially inner portion for slidably engaging with said stud.

3. A tool changer according to claim 1, wherein said protrusions each include a circular member formed in a radially outer portion and having a circular outer surface for engaging with said projection.

4. A tool changer according to claim 3, wherein said protrusions each include a shoulder formed in said radially outer portion and formed in said circular member.

5. A tool changer according to claim 1, wherein said rod includes a board secured to said first end thereof, said projection and said stud and said at least one stop are extended from said board.

6. A tool changer according to claim 5, wherein said projection has a length greater than that of said stud and said at least one stop.

* * * * *